May 18, 1965 H. SCHICK ETAL 3,183,985
DOUBLE BEAM BALANCE

Filed Oct. 14, 1963 2 Sheets-Sheet 2

Inventors:
HANS SCHICK AND
MANFRED KAMMERER

By: McGlew and Toren
Attorneys

United States Patent Office 3,183,985
Patented May 18, 1965

3,183,985
DOUBLE BEAM BALANCE
Hans Schick and Manfred Kammerer, Ebingen, Germany,
assignors to August Sauter K.G., Ebingen, Germany
Filed Oct. 14, 1963, Ser. No. 315,755
Claims priority, application Germany, Oct. 17, 1962,
S 82,085
15 Claims. (Cl. 177—217)

The invention relates to a double beam balance, of which each beam is supported on a central knife edge, and having a shaft that transmits the gross force to a knife edge provided at one end of each beam.

A somewhat similar arrangement is known, but the beams are not supported on knife edges, rather on ball bearings, and are coupled by a tightly stretched crossed band. This band coupling is intended to make it unnecessary to provide a special arrangement for tilted supporting surfaces of the balance. This band coupling is associated, above all, with a considerable amount of frictional resistance. This disadvantage is exhibited by other balances, of which, for the purpose of linearizing the angular movement of the indicator, both beams possess a particularly curved track, which is acted upon by the gross force transmitted by bands from the balance platform. Since the accuracy of the balance is directly determined by these curved tracks, they must be very accurately made. Small pieces of dirt, dust, and such like, between the curved tracks and the unrolling or uncoiling bands can impair the accuracy.

Other known constructions, wherein the curved tracks and bands are provided with a polygonal link for the purpose of linearizing the angular movement and correcting the factors influencing the angular movement these factors, for example, being coupling length, the change of the relative angular postion of the load transmitting shafts, or pre-loading of the balance platform, are undesirable from the point of view of low friction, since the many joints of a polygonal link require considerable force.

The purpose of the invention is a balance, of the kind described in the first paragraph above, that is so improved by simple means that, possesing a very high degree of accuracy, it operates with the greatest freedom from friction, and of which the beams obey exactly the tangent law.

Essentially, the invention is characterized by a shaft provided with a rigid cross member which transmits the forces, through an intermediate member associated with each beam and having rolling elements, equally to the end knife edges of the beams, the equal distribution of said forces being independent of the position of the respective beams and parallel to one another and perpendicular to the line joining the axes about which the beams turn, the said intermediate members making possible low friction relative movement between the beams and the platform; a guide piece, rigid with the shaft, for centrally guiding the same; and a curved part, one rigid with each beam, of such a kind that, during axial movement of the shaft, the guide piece moves practically without friction over the curved parts. This arrangement makes additional means for correcting the angular movement unnecessary.

In a further, and particulary advantageous, embodiment of the invention, the two sides of the guide piece describe arcs of a circle, of which the radius is equal to the distance between the central and end knife edges of a beam and the center coincides with the axis about which the beam turns; and the curved parts associated with the beams have a circular bearing surface, of which the radius is equal to one-half the distance between the central and end knife edges and center is located at the center of the line joining the central and end knife edges.

An object of the invention is an improved double beam balance of unusually low friction and consequent high accuracy, yet of simple mechanical construction.

Another object of the invention is an improved double beam balance, of which the forces applied to the beams are parallel for all angular positions of the beams.

A further object of the invention is an improved double beam balance, of which the forces applied to the beams are parallel to one another and perpendicular to a line adjoining the pivot points of the two beams.

Further details, advantages, characteristics, and objects of the invention will be apparent from the following detailed description and figures of the drawings, in which.

Figure 1:
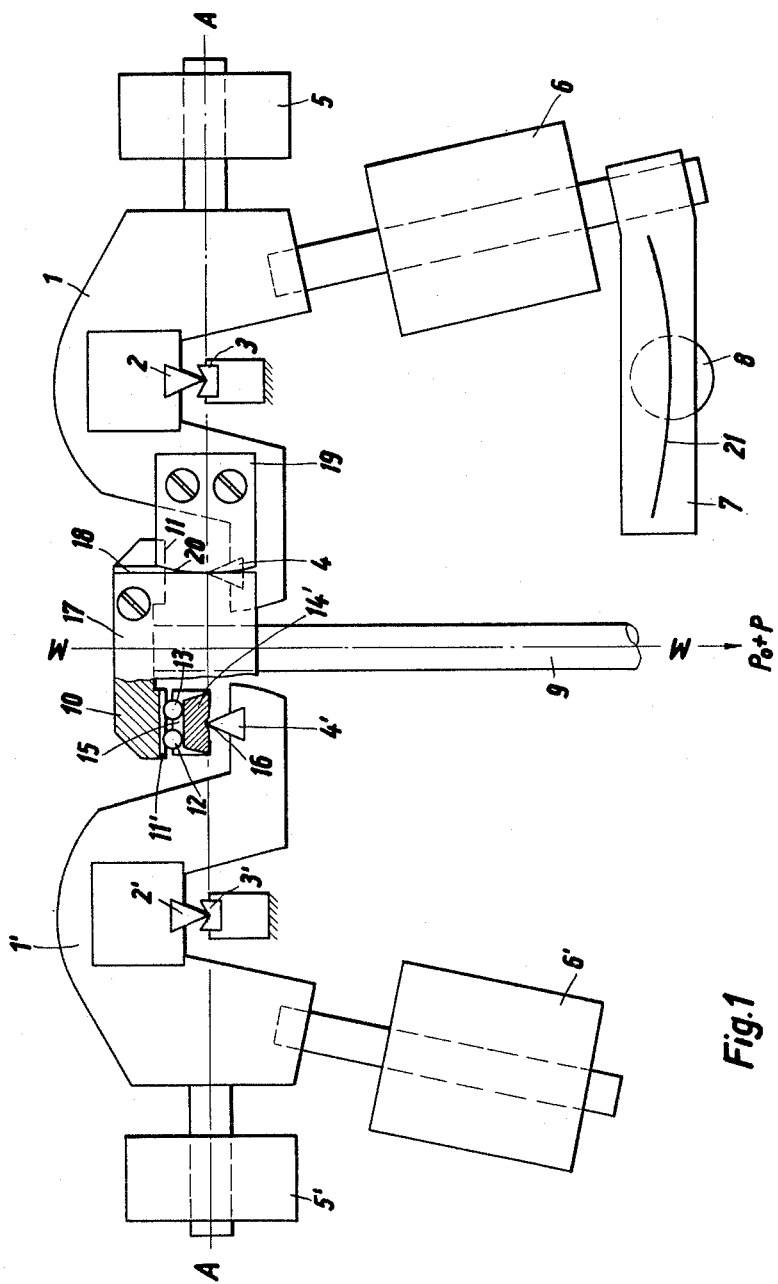
FIG. 1 is a side view, with a broken away section, of one form of the invention.

As shown in FIGURE 1, the balance arrangement includes two beams 1 and 1' each having first and second ends. The two beams turn on central knife edges 2 and 2' supported on bearings 3 and 3'. The two beams also have end knife edges 4 and 4', upon which the total or gross force ($P_o+P$) is exerted. This total force is balanced by means of counter weights 5 and 5' and the inclined weights 6 and 6'. That portion of the scale showing the actual position of equilibrium is projected on a screen (not shown), by means of a scale 7 arranged on beam 1 and a projection system shown diagrammatically at 8. The initial stressing force $P_o$, due to the balance itself, and the force P of the load are transmitted from the balance platform (not shown) through the connecting shaft 9 to the beams 1 and 1'. The axis M—M of the shaft is perpendicular to the line A—A connecting the points of rotation of the two beams. A crossbar or crossmember 10, having at either end a triangular prismatic shaped configuration, 11 and 11', in which two bearings 12 and 13 roll, is securely connected to the shaft 9. This construction is more clearly shown in the broken away section to the left of the shaft, in FIGURE 1. The bearings are supported on an independent intermediate member 14 having an upper polished rolling or bearing surface 15 and a lower groove 16, which latter receives the end knife edge 4' or 4 of the respective beam 1' or 1. As is customary, a cage, not shown, prevents the bearings from rolling off the bearing surface.

A guide piece 17 is rigidly connected to the cross member 10 and has a bearing surface 18 on either side, only that on the right being shown. For small angular movements of the beams (small perpendicular displacements of the cross member 10), the bearing surfaces 18 can be flat. The bearing faces 18 of the guide piece bear upon the corresponding curved part 19, of which the opposing face is also a bearing surface 20. Assuming small angular movements of the beams, the surface 20 is the arc of a circle whose radius is equal to the distance separating the central and end knife edges of the beam and whose center coincides with the center of rotation of the beam.

Figure 2:
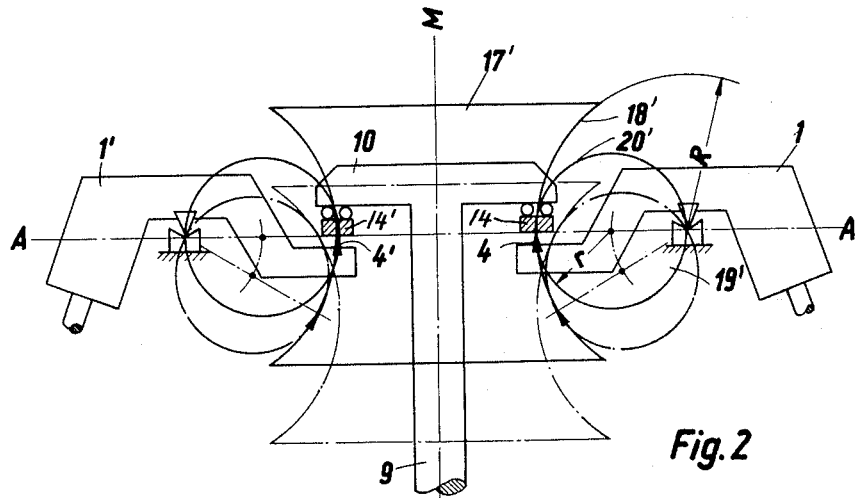
FIG. 2 is a detailed view of another form of the invention.

In the event of larger angular movements of the beams, the embodiment of FIGURE 2, avoiding sliding between the bearing surfaces 18 and 20 and thereby a disturbing friction when the shaft 9 moves, is advantageous. Thus, the two curved bearing surfaces 18' of the guide piece 17' have a radius R equal to the distance between the central and end knife edges of the beam and a center coinciding with the axis about which the beam turns, as shown in FIGURE 2. With additional weight on the platform, the guide piece 17' is moved to the lower position indicated in dot-dash line. The curved part 19', in this embodiment, possesses a bearing surface 20', in the shape of a circle, having a radius r equal to one-half of the distance between the central and end knife edges. The center of the circle thus defined lies at the center point of the line connecting the central and end knife edges. The curved part 19' thus rolls on the curved surface 18' having the radius R. Sliding between 19' and 17' is avoided.

In FIGURE 1, the beam arrangement is shown in its central position; in other words, the force or weight P on the platform is one-half of the full load. The forces acting on knife edges 4 and 4' are exactly equal and their directions are parallel to the axis M—M of the shaft 9. If the loading of the platform is increased, the shaft 9 and cross member 10 move downwards until the opposing moment of the inclined weights 6 and 6' equals that arising from the load. During movement of the beams 1 and 1', the knife edges 4 and 4' describe arcs of circles whose centers coincide with the center of rotation of the beams. Correspondingly, the members 14 and 14', of which the grooves 16 bear upon the end knife edges, also describe a circular path. In other words, this means that the distance between knife edges 4 and 4' is variable and that the members 14 and 14' have a corresponding lateral displacement to the one or other side. In order to permit a low friction lateral movement of members 14 and 14' with respect to the cross member 10, this latter member is supported by members 14 and 14' through round elements, preferably two ball bearings. In consequence of the guiding action provided by the guide piece 17 and bearing surfaces 18 and by the curved part 19 and bearing surfaces 20, shaft 9 is always centrally located between the two beams. Therefore, by means of the cross member 10, the gross force $P+Po$ is divided equally between the knife edges 4 and 4' of the beams 1 and 1', whereby the direction of the downward force is always parallel to the axis M—M of the shaft 9, whatever the vertical position of the latter may be. The forces acting on the knife edges 4 and 4' are consequently always parallel. This condition results in the strict proportionality between the tangent of the angular movement of the beam and the magnitude of the force P acting on the end knife edge of that beam. The length of the shaft 9 and the size of the initial stressing force Po are, therefore, of no influence. In accordance with the invention, the graduations 21 on the projected scale 7 are graduated in accordance with this tangential relationship.

Figure 3:
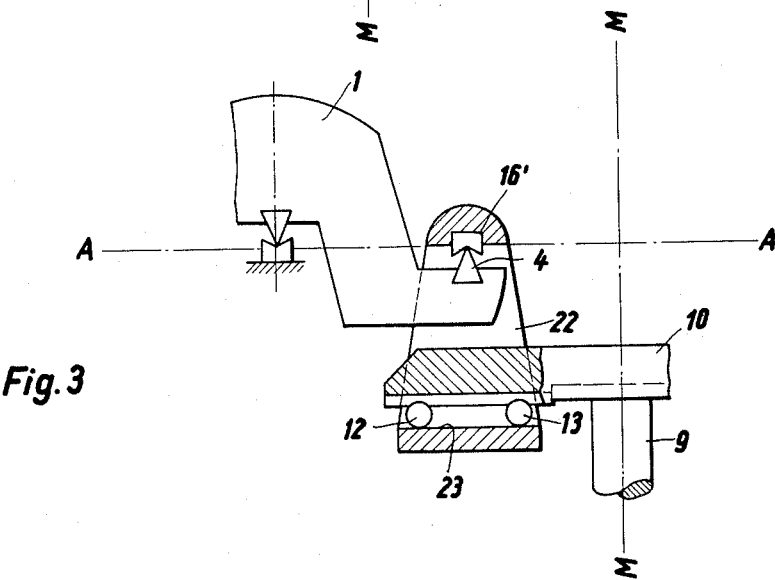
FIG. 3 is a broken away view of another form of the intermediate member.

In the embodiment of FIGURE 3 a pendant element 22 is employed for each beam in place of the member 14 of FIGURES 1 and 2. The pendant is suspended with its grooved bearing surface 16' from the knife edge 4 of beam 1. The lower part of the pendant is constructed with a bearing surface 23 for ball bearings 12 and 13. By means of the force transmitted by the two ball bearings, the surface 23 is always held parallel to the cross member 10. In consequence this embodiment also assures that the direction of the force exerted on the knife edges 4 and 4' is parallel to the axis M—M of the shaft 9.

In the illustrated embodiments of the invention, the ball bearings roll on paths that define a right angle with the axis M—M of the shaft 9. Correspondingly, the forces acting on the knife edges 4 and 4' are parallel to the axis M—M. Obviously, the rolling paths of balls 13 and 12 can define with this axis some angle deviating more or less from 90°. However, these angles must lie symmetrically with respect to the axis M—M. In this instance, of course, transverse components of the transmitted forces are involved, and act upon the central knife edges 2 and 2' and bearing surfaces 3 and 3.

While there have been described what are considered to be the preferred embodiments of the invention, it will be obvious to those skilled in the art that modifications can be made therein without departing therefrom; and the appended claims are intended to cover all such modifications as fall within the true scope and spirit of the invention.

What I claim is:

1. In a balance, the combination of first and second beams, each having a first and second end; first and second central knife edge means associated respectively with said first and second beams and located between said first and second ends for supporting said beams for rotation at respective first and second fixed points; first and second load knife edge means associated respectively with said first and second beams and separated from the corresponding first and second central knife edge means by a distance in the direction of said first ends; first means moving in response to the load to be weighed; a transverse member associated with said first means and having first and second ends; two first members, one associated with each of said first and second ends of said transverse member and each having a first bearing surface for the corresponding first and second load knife edge means for transmitting to the respective first and second load knife edge means, as equal and parallel forces for all angular positions of the beams, the movement of said transverse member when said first means moves; and second means, located between said transverse member and the respective first members and in physical contact therewith, for permitting a low friction lateral movement of said first members with respect to said transverse member and first means, as the corresponding beams rotates about its fixed point, and for insuring a constant clearance, at all times, between said transverse member and said first members.

2. The combination of claim 1, including third means associated with said first means and having second and third bearing surfaces; two fourth means, one associated with each beam, each having a fourth bearing surface cooperating with a respective one of said second and third bearing surfaces, whereby said first means is always centrally located between said two fourth means; and of said second, third and fourth bearing surfaces at least said fourth bearing surfaces, in the plane of rotation of the corresponding beam, have a circular curve, the curve of said fourth bearing surfaces having a radius equal to the distance R and a center located at the point of rotation of the respective beam, whereby said first means can move with low friction.

3. The combination of claim 1, including third means associated with said first means and having second and third bearing surfaces; two fourth means, one associated with each beam, each having a fourth bearing surface cooperating with a respective one of said second and third bearing surfaces, whereby said first means is also centrally located between said two fourth means; and of said second, third, and fourth bearing surfaces at least said fourth bearing surfaces, in the plane of rotation of the corresponding beam, have a circular curve, having a radius one-half the distance R and a center lying midway between the two defined knife edges of the corresponding beam.

4. The combination of claim 1, wherein said second means are bearing means and each of said first members has a further bearing surface over which said bearing means can roll.

5. The combination of claim 4, wherein said further bearing surfaces are perpendicular to the movement of said first means, whereby said forces are perpendicular to a line joining said first and second fixed points.

6. The combination of claim 4, wherein said first members are located respectively between said first and second load knife edge means and said first and second ends of said transverse member.

7. The combination of claim 4, wherein said first members are suspended from said first and second load knife edge means, and the respective end of said transverse member lies between the first end of the corresponding beam and the corresponding further bearing surface.

8. The combination of claim 2, wherein said second means are bearing means and each of said first members has a further bearing surface over which said bearing means can roll.

9. The combination of claim 8, wherein said first members are located respectively between said first and second load knife edge means and said first and second ends of said transverse member.

10. The combination of claim 8, wherein said first members are suspended from said first and second load knife edge means, and the respective end of said transverse member lying between the first end of the corresponding beam and the corresponding further bearing surface.

11. The combination of claim 3, wherein said second means are bearing means and each of said first members has a further bearing surface over which said bearing means can roll.

12. The combination of claim 11, wherein said first members are located respectively between said first and second load knife edge means and said first and second ends of said transverse member.

13. The combination of claim 11, wherein said first members are suspended from said first and second load knife edge means, and the respective end of said transverse member lying between the first end of the corresponding beam and the corresponding further bearing surface.

14. In a balance, the combination of first and second beams, each having a first and second end; first and second central knife edge means associated respectively with said first and second beams and located between said first and second ends, for supporting said beams for rotation at respective first and second fixed points; first and second load knife edge means associated respectively with said first and second beams, separated from the corresponding first and second central knife edge means by distance R, and located in the direction of said first ends; first means moving in response to the load to be weighed; a transverse member associated with said first means and having first and second ends; two first members, one associated with each of said first and second ends of said transverse member, each having a first bearing surface for the corresponding first and second load knife edge means, for transmitting to the respective first and second load knife edge means, as equal and parallel forces for all angular positions of the beams, the movement of said transverse member when said first means moves; and guide means associated with said first means and having second and third bearing surfaces; two bearing surface means, one for each beam, co-operating with a respective one of said second and third bearing surfaces, whereby said first means is always centrally located between said two bearing surface means; and of said second and third bearing surfaces and said two bearing surface means at least said two bearing surface means, in the plane of rotation of their beams, have a circular curve, the curve of said two bearing surface means having a radius R and a center located at the point of rotation of the respective beam, whereby said first means can move with low friction.

15. In a balance, the combination of first and second beams, each having a first and second end; first and second central knife edge means associated respectively with said first and second means and located between said first and second ends, for supporting said beam for rotation at respective first and second fixed points; first and second load knife edge means associated respectively wtih said first and second beams, separated from the corresponding first and second central knife edge means by distance R, and located in the direction of said first ends; first means moving in response to the load to be weighed; a transverse member associated with said first means and second ends; two first members, one associated with each of said first and second ends of said transverse member, each having a first bearing surface for the corresponding first and second load knife edge means, for transmitting to the respective first and second load knife edge means, as usual and parallel forces for all angular positions of the beams, the movement of said transverse member when said first means moves; and guide means associated with said first means and having second and third bearing surfaces; two bearing surface means, one for each beam, cooperating with a respective one of said second and third bearing surfaces, whereby said first means is always centrally located between said two bearing surface means; and of said second and third bearing surfaces and said two bearing surface means at least said two bearing surface means, in the plane of rotation of their beams, having a circular curve, the curve of said two bearing surface means having a radius one-half R and a center lying midway between the two defined knife edges of the corresponding beams, whereby said first means can move with low friction.

References Cited by the Examiner

UNITED STATES PATENTS

| | | | |
|---|---|---|---|
| 909,745 | 1/09 | Bradley | 177—219 |
| 1,078,416 | 11/13 | Charet | 177—217 |
| 1,145,928 | 7/15 | Sirch | 177—217 |
| 2,527,042 | 10/50 | Laar et al. | 177—219 |
| 2,618,476 | 11/52 | Schroeder | 177—219 |

LEO SMILOW, *Primary Examiner.*